(12) United States Patent
Yu et al.

(10) Patent No.: US 11,008,251 B2
(45) Date of Patent: May 18, 2021

(54) UNDERWATER NON-DISPERSIBLE QUICK-SETTING AND RAPID-HARDENING CEMENT-BASED COMPOSITE MATERIAL AND PREPARATION METHOD AND APPLICATION THEREOF

(71) Applicants: Jiahuan Yu, Liaoning (CN); George Jiebao Yu, Liaoning (CN)

(72) Inventors: Jiahuan Yu, Liaoning (CN); George Jiebao Yu, Liaoning (CN)

( * ) Notice: Subject to any disclaimer, the term of this patent is extended or adjusted under 35 U.S.C. 154(b) by 638 days.

(21) Appl. No.: 15/946,806

(22) Filed: Apr. 6, 2018

(65) Prior Publication Data
US 2018/0290923 A1    Oct. 11, 2018

(30) Foreign Application Priority Data
Apr. 7, 2017    (CN) .......................... 201710223235.0

(51) Int. Cl.
| | |
|---|---|
| *C04B 28/06* | (2006.01) |
| *C04B 11/28* | (2006.01) |
| *C04B 9/11* | (2006.01) |
| *C04B 7/32* | (2006.01) |
| C04B 7/36 | (2006.01) |
| C04B 32/00 | (2006.01) |
| C04B 28/00 | (2006.01) |
| C04B 7/00 | (2006.01) |
| C04B 7/34 | (2006.01) |
| C04B 103/61 | (2006.01) |
| C04B 111/00 | (2006.01) |
| C04B 103/30 | (2006.01) |
| C04B 103/00 | (2006.01) |
| C04B 111/72 | (2006.01) |
| C04B 111/74 | (2006.01) |

(52) U.S. Cl.
CPC ................ *C04B 7/32* (2013.01); *C04B 28/06* (2013.01); *C04B 2103/008* (2013.01); *C04B 2103/302* (2013.01); *C04B 2103/304* (2013.01); *C04B 2103/61* (2013.01); *C04B 2111/00689* (2013.01); *C04B 2111/72* (2013.01); *C04B 2111/74* (2013.01); *C04B 2201/05* (2013.01); *C04B 2201/50* (2013.01); *C04B 2235/3427* (2013.01); *C04B 2235/442* (2013.01); *C04B 2235/443* (2013.01)

(58) Field of Classification Search
USPC ................................................. 106/638, 692
See application file for complete search history.

(56) References Cited

U.S. PATENT DOCUMENTS

2007/0261607 A1* 11/2007 Utagaki .................. C04B 18/26
106/805

FOREIGN PATENT DOCUMENTS

| | | | |
|---|---|---|---|
| JP | 2008201656 A | * | 9/2008 |
| KR | 1536118 B1 | * | 7/2015 |

* cited by examiner

*Primary Examiner* — James E McDonough
(74) *Attorney, Agent, or Firm* — Houtteman Law LLC

(57) ABSTRACT

The present invention belongs to the field of composite materials, particularly to an underwater non-dispersible quick-setting and rapid-hardening cement-based composite material and the preparation method and application thereof. The material consists of the following raw materials in percentage by weight: 32%-34% of silicate cement, 8.8%-9% of calcium aluminate, 5%-7% of magnesium oxide, 0.5%-2% of sulfur trioxide, 0.2%-0.3% of polycarboxylate high performance water-reducing agent, 0.3%-0.7% of flocculant, 0.05%-0.2% of setting accelerator, 0.05%-0.2% of air-entraining agent, 0.05%-0.3% of rust inhibitor, 26%-31% of fine aggregate, 13%-18% of coarse aggregate, and 8.4%-8.5% of water. The material can be used for rapid repair of cement buildings in water conservancy projects, the repair material can be quickly set and the initial strength can be guaranteed.

12 Claims, No Drawings

UNDERWATER NON-DISPERSIBLE QUICK-SETTING AND RAPID-HARDENING CEMENT-BASED COMPOSITE MATERIAL AND PREPARATION METHOD AND APPLICATION THEREOF

TECHNICAL FIELD

The present invention belongs to the field of composite materials, particularly to an underwater non-dispersible quick-setting and rapid-hardening cement-based composite material and the preparation method and application thereof.

BACKGROUND ART

With the continuous development of society, more and more hydraulic engineering projects have been launched in succession. When the traditional concrete used in the projects is poured under water, the cementitious materials and aggregates are likely to be severely segregated, resulting in the phenomena of bleeding and laitance, and even washing the concrete away by water, which results in a decrease in the strength and durability of concrete and serious pollution to the waters around the projects. Therefore, during construction, it is necessary to avoid contact between concrete and water as much as possible, for example, by the cofferdam and drainage method, the bag-stacking method, the prepacked aggregate grouting method, or construction with construction tools such as tremies and bottom-open containers. Nevertheless, although the above method can ensure the quality of concrete, it has disadvantages such as huge amount of work, long construction period, high construction cost, and complicated process.

In recent years, studies have found that the addition of flocculants (water-soluble polymer compounds with long chain structures and high adsorptive capacity) to underwater non-dispersible concrete can make the cementitious materials in the concrete adsorbed to the aggregate, thereby improving the cohesion, avoiding the loss of cementitious materials, and ensuring the strength of the concrete. Currently, the two most widely used flocculants are water-soluble cellulose ethers (SCR) and water-soluble acrylic polymers (UWB), respectively. Due to the addition of flocculants, many performance indicators of underwater non-dispersible concrete will also be changed as compared with the ordinary concrete, for example, the initial setting time will be delayed relatively, and the like. It has been tested and found that the initial setting time for the underwater non-dispersible concrete was delayed by 1-3 h as compared with the ordinary concrete incorporated with equal amounts of SCR; the initial setting time for the underwater non-dispersible concrete was delayed by 6 h as compared with the ordinary concrete incorporated with equal amounts of UWB; and the initial setting time will be prolonged with the increase of the addition amount of flocculants. If facing projects requiring rapid concrete setting, such as situations of cracks, scour holes and honeycombs often occurred on bridge piers or reservoir dams, or situations of encountering larger waves and the like in sea repair operations, there would be a need for materials capable of quickly setting and quickly increasing strength, and the above methods are no longer applicable. For example, after a typhoon hit a century-old landmark building, trestle in Qingdao, in 2013, a large area of the bridge road collapsed, and in order to repair the bridge, the collapsed trestle bridge was completely excavated and broken by the repair party, resulting in damages to the cultural relic. The main reasons for the collapse of the trestle bridge are as follows: the concrete bridge piers had been immersed in seawater for a long time, resulting in breakage by scour of seawater; the chloride ions in the seawater penetrate into the bridge piers and rust the steel bars; furthermore, the broken parts are not repaired in time; finally, the complete destruction occurred under a strong force of the typhoon. If the bridge piers can be repaired to meet an emergency, the trestle bridge collapse would not happen.

In summary, it is particularly important to develop a composite material that can meet the requirements of cement building repair in water conservancy projects under emergency conditions.

SUMMARY OF THE INVENTION

In response to the above problems, the present invention provides an underwater non-dispersible quick-setting and rapid-hardening cement-based composite material and the preparation method and application thereof, and the material can be used for rapid repair of cement buildings in water conservancy projects, the repair material can be quickly set and the initial strength can be guaranteed.

In order to achieve the above object, the present invention provides the underwater non-dispersible quick-setting and rapid-hardening cement-based composite material consisting of the following raw materials in percentage by weight: 32%-34% of silicate cement, 8.8%-9% of calcium aluminate, 5%-7% of magnesium oxide, 0.5%-2% of sulfur trioxide, 0.2%-0.3% of polycarboxylate high performance water-reducing agent, 0.3%-0.7% of flocculant, 0.05%-0.2% of setting accelerator, 0.05%-0.2% of air-entraining agent, 0.05%-0.3% of rust inhibitor, 26%-31% of fine aggregate, 13%-18% of coarse aggregate, and 8.4%-8.5% of water.

The silicate cement is preferably an ordinary silicate 42.5R cement.

The flocculant is an acrylic flocculant, preferably UWB-II.

The setting accelerator can be selected from lithium carbonate, sodium silicate or potassium aluminate, preferably lithium carbonate.

The air-entraining agent can be selected from calcium lignosulphonate or alkyl benzoic acid, preferably JM2000 new type concrete air-entraining agent.

The rust inhibitor can be selected from a nitrite, amino alcohol or amino carboxylic acid rust inhibitor, preferably calcium nitrite In order to achieve the above object, the present invention further provides a method for preparing the cement-based composite material, specifically as follows: weighing the calcium aluminate, silicate cement, magnesium oxide, sulfur trioxide, polycarboxylate high performance water-reducing agent, setting accelerator, flocculant, air-entraining agent, rust inhibitor, fine aggregate and coarse aggregate successively at the required ratio of the raw materials, placing them in a mixing drum for stirring at a constant speed for 5-10 minutes until the materials are stirred to be uniform, slowly adding water at the required weight proportion to the mixing drum and stirring continuously for 1-2 minutes until the materials are uniformly viscous.

Beneficial Effects of the Invention

The calcium aluminate used in the present invention has a rapid hydration reaction releasing a large amount of hydration heat so that the early strength is rapidly increased, and the aluminum hydroxide gel generated in the hydration process forms a protective film on the surface of concrete particles, so that the concrete has a compact structure and has strong resistance to sulfate erosion, and thus the calcium aluminate is very suitable for emergency repair works of underwater concrete buildings; the cement-based composite material of the present invention has excellent performances, and various raw materials interact with each other where high quality calcium aluminate with preferred $Al_2O_3$ content of more than 53% and CaO content of 29% to 31% can react with ordinary silicon to shorten the initial setting time of the material and increase the initial strength of the material; sulfur trioxide can react with water to release a large amount of hydration heat, promote the early reaction of the material, and increase the setting rate of the material; magnesium hydroxide is generated from magnesium oxide through hydration reaction to cause the volume expansion of the material, improve the strength of the material and crack resistance; ordinary silicate 42.5R cement, as a cementitious material, has a sufficient supply and is easy to purchase, with characteristics such as high strength, large hydration heat and quick hydration reaction; the incorporation of flocculant to fresh concrete can ensure that the concrete has the characteristics of inhibiting cement loss and aggregate segregation during the pouring process in water, and by adding acrylic flocculants, the water-soluble polymer compounds therein have very strong adsorptive capacity that can adsorb the aggregates of cement particles together, which improves the anti-segregation and anti-washing abilities of the concrete more effectively; the water-reducing agent can ensure that the mixing water consumption can be reduced to increase the concrete strength under the condition of not changing the workability and cement amount of the concrete, the usage amount of cement can be saved under the condition of not changing the workability and strength, and the polycarboxylate high performance water-reducing agent can harden the pore structure of the cement paste, and delay the further transformation of the hydrate produced from calcium aluminate into a metastable phase hydration product ($CAH_{10}C_2AH_8$) to ensure the subsequent strength of the material; the setting accelerator, as an additive, can accelerate the hydration and hardening of cement, forming sufficient strength in a short time to meet the construction requirements; the setting accelerator can make the material form a paste in a very short time and aggregate into a crystal structure, and increase its initial structural strength; the performance index of the coarse aggregate plays an important role in the strength of the concrete, and the present invention adopts gravels with a continuous gradation and an aggregate particle diameter of 5-30 mm; the fine aggregate adopts medium sand with a continuous gradation and an aggregate particle diameter of 1 to 3 mm; the air-entraining agent improves the fluidity of the concrete, improves the pumping performance, reduces the bleeding and segregation of the concrete, and improves the freezing resistance, permeability resistance and durability of the concrete; and the rust inhibitor can effectively suppress and delay the rusting of steel bars in the concrete by chloride salts.

Compared with the initial setting time required by the ordinary underwater non-dispersible concrete of several hours, the cement-based composite material of the present invention has an initial setting time of six minutes in the air and seven minutes under water, the initial setting times are shorter while satisfying the underwater non-dispersion condition. Furthermore, the early strength can reach 15 Mpa at two hours and 30 MPa at 24 hours. In the rapid repair projects, the ordinary underwater non-dispersible concrete that is currently widely used requires a lot of time for initial setting with slow increase in strength, unable to meet the project requirement, or even delays the construction process, resulting in a greater danger, while the present material with characteristics of quick-setting and early-strengthening can perfectly solve this requirement. This is currently not available for all underwater non-dispersible materials in China.

DETAILED DESCRIPTION OF EMBODIMENTS

The present invention will be further described below in combination with specific examples.

Example 1

Provided is an underwater non-dispersible quick-setting and rapid-hardening cement-based composite material and the preparation method and application thereof, and the material used comprises calcium aluminate, an ordinary silicate cement, magnesium oxide, sulfur trioxide, a high efficiency water-reducing agent, a setting accelerator (lithium carbonate), JM2000 new type concrete air-entraining agent, calcium nitrite, an acrylic flocculant, fine aggregates, coarse aggregates, and water.

The proportions of various substances and the preparation method are as follows:

8.8% of calcium aluminate, 32% of ordinary silicate 42.5R cement, 5% of magnesium oxide, 1.2% of sulfur trioxide, 0.3% of polycarboxylate high performance water reducing agent, 0.2% of lithium carbonate, 0.7% of acrylic flocculant UWB-II, 0.2% of JM2000 new type concrete air-entraining agent, 0.3% of calcium nitrite, 26% of fine aggregates, and 16.8% of coarse aggregates were weighed according to the proportions, and added to a mixing drum, followed by starting the mixer to stir the materials evenly, then slowly adding 8.5% of water to the mixing drum, and stirring continuously after all the water was added, until the materials were evenly viscous.

I. Test Results of Cement-Based Composite Materials in Example 1.

1. Setting Time.

The experimental instruments adopt the instruments and apparatuses specified in GB1346 "Method for Detecting Water Consumption for Cement Standard Consistency, Setting Time, and Stability of Cement". The materials produced according to the proportions were immediately poured into round molds which were divided into two groups, vibrated several times, and wiped to dry after removing excess thick paste, followed by placing one in the air and the other under water. Finally, the initial setting time of the material in the air was measured to be 6 minutes, and the initial setting time under water was 7 minutes.

2. Compressive Strength.

The underwater non-dispersible cement-based composite material in total of 2000 g made according to the proportions was poured into the mixing drum, to which a fixed proportion of water was then added, the materials were immediately poured into a 4×4×16 $cm^3$ test mold after stirring uniformly, and tamped 20 times with a tamping stick. The test mold was vibrated on the ground for 2-3 minutes while wiping the excess material overflowing the surface off with a trowel, and three sample strips in the same test mold were numbered and marked with age and the like. The compressive strength of the material was measured after two hours, the average value of the three samples was taken, and finally the measured strength was 15 Mpa.

3. Performance Test Results of Example 1 were Shown in Table 1.

TABLE 1

Performance test results of the cement-based
composite material of Example 1.

| Experimental item | Time | Experimental data | |
|---|---|---|---|
| Compressive | 2 h | 15 | (Mpa) |
| strength | 1 d | 30 | (Mpa) |
| | 7 d | 38.2 | (Mpa) |
| | 14 d | 43.8 | (Mpa) |
| | 28 d | 51.2 | (Mpa) |
| Slump flow | — | 515 | (mm) |
| Suspension content | — | 150 | (mg/L) |

II. The Method of Using the Cement-Based Composite Material of the Present Invention—the Tremie Method.

1. Preparation work: the prepared cement-based material was checked for uniformity and fluidity, there should be no obvious bleeding and segregation phenomena, the slump was controlled between 180-220 mm, and the work radius of the tremie was calculated, and the tremie was arranged in detail.

2. Pouring by the method of jacking the tremie vertically: a tremie with a stronger sealing performance was used, a funnel was mounted and fastened on the top of the tremie, the bottom of the tremie was plugged with a waterproof plug which was hoisted with an iron wire; before pouring, the tremie in water was filled with the cement-based composite material with a good slump to ensure that the material punched out after opening the funnel was sufficient to seal the bottom end of the tremie so that the water cannot enter the tremie; and after meeting the requirements, the iron wire was cut off and the pouring was started.

During the pouring, the feeding funnel should be kept filled with the material at all times, and continuous pouring was carried out, which can ensure that the tremie was always filled with the material; and the lower port of the tremie must ensure that the depth into the pouring material was not less than 1 m to prevent the occurrence of reverse flow of water upwards.

It would be best not to move the tremie horizontally during pouring, and the tremie should be raised up slowly while pouring, until the pouring is completed.

Example 2

The underwater non-dispersible quick-setting and rapid-hardening cement-based composite material consists of the following raw materials in percentage by weight: 32.5% of silicate cement, 9% of calcium aluminate, 5% of magnesium oxide, 0.5% of sulfur trioxide, 0.2% of polycarboxylate high performance water-reducing agent, 0.3% of acrylic flocculant UWB-☐, 0.15% of lithium carbonate, 0.05% of JM2000 new type concrete air-entraining agent, 0.3% of calcium nitrite, 28.5% of fine aggregate, 15% of coarse aggregate, and 8.5% of water.

Comparative Example 1

A material is composed of 8.8% of fly ash, 32% of ordinary silicate 42.5R cement, 5% of magnesium oxide, 0.3% of polycarboxylate high performance water-reducing agent, 0.2% of lithium carbonate, 0.7% of acrylic flocculant UWB-II, 0.2% of JM2000 new type concrete air-entraining agent, 0.3% of calcium nitrite, 27% of fine aggregate, 17% of coarse aggregate, and 8.5% of water.

After testing, this material, which had the calcium aluminate in Example 1 replaced with fly ash commonly used in an ordinary underwater concrete, without addition of sulfur trioxide, had an initial setting time of 8 h, a final setting time of 24 h, and the 1 d strength of 8.3 MPa.

Comparative Example 2

A material is composed of 8.8% of calcium aluminate, 32% of ordinary silicate 42.5R cement, 5% of magnesium oxide, 1.2% of sulfur trioxide, 0.2% of lithium carbonate, 0.7% of acrylic flocculant UWB-II, 0.2% of JM2000 new type concrete air-entraining agent, 0.3% of calcium nitrite, 26% of fine aggregate, 16.8% of coarse aggregate, and 8.8% of water.

After testing, this material had a 28 d strength of 42.8 Mpa without the addition of a water-reducing agent.

The invention claimed is:

1. An underwater non-dispersible quick-setting and rapid-hardening cement-based composite material, consisting of the following raw materials in percentage: 32%-34% of silicate cement, 8.8%-9% of calcium aluminate, 5%-7% of magnesium oxide, 0.5%-2% of sulfur trioxide, 0.2%-0.3% of polycarboxylate high performance water-reducing agent, 0.3%-0.7% of flocculant, 0.05%-0.2% of setting accelerator, 0.05%-0.2% of air-entraining agent, 0.05%-0.3% of rust inhibitor, 26%-31% of fine aggregate, 13%-18% of coarse aggregate, and 8.4%-8.5% of water.

2. The cement-based composite material of claim 1, wherein the silicate cement is preferably an ordinary silicate 42.5R cement.

3. The cement-based composite material of claim 1, wherein the flocculant is an acrylic flocculant, preferably UWB-II.

4. The cement-based composite material of claim 1, wherein the setting accelerator is lithium carbonate, sodium silicate or potassium aluminate, preferably lithium carbonate; and the air-entraining agent is calcium lignosulphonate or alkyl benzoic acid, preferably JM2000 new type concrete air-entraining agent; and the rust inhibitor is a nitrite, amino alcohol or amino carboxylic acid rust inhibitor, preferably calcium nitrite.

5. The cement-based composite material of claim 1, consisting of the following raw materials in percentage by weight: 8.8% of calcium aluminate, 32% of ordinary silicate 42.5R cement, 5% of magnesium oxide, 1.2% of sulfur trioxide, 0.3% of polycarboxylate high performance water-reducing agent, 0.2% of lithium carbonate, 0.7% of acrylic flocculant UWB-II, 0.2% JM2000 new type concrete air-entraining agent, 0.3% of calcium nitrite, 26% of fine aggregate, 16.8% of coarse aggregate and 8.5% of water.

6. The cement-based composite material of claim 1, wherein the underwater non-dispersible quick-setting and rapid-hardening cement-based composite material consists of the following raw materials in percentage by weight: 32.5% of silicate cement, 9% of calcium aluminate, 5% of magnesium oxide, 0.5% of sulfur trioxide, 0.2% of polycarboxylate high performance water-reducing agent, 0.3% of flocculant, 0.15% of setting accelerator, 0.05% of air-entraining agent, 0.3% of rust inhibitor, 28.5% of fine aggregate, 15% of coarse aggregate, and 8.5% of water.

7. A method for preparing the cement-based composite material of claim 1, wherein the method is specifically as follows: weighing the calcium aluminate, silicate cement, magnesium oxide, sulfur trioxide, polycarboxylate high performance water-reducing agent, setting accelerator, flocculant, air-entraining agent, rust inhibitor, fine aggregate and coarse aggregate successively at the required ratio of the raw materials, placing them in a mixing drum for stirring at a constant speed for 5-10 minutes until the materials are stirred to be uniform, slowly adding water at the required weight proportion to the mixing drum and stirring continuously for 1-2 minutes until the materials are uniformly viscous.

8. A method for preparing the cement-based composite material of claim 2, wherein the method is specifically as follows: weighing the calcium aluminate, silicate cement, magnesium oxide, sulfur trioxide, polycarboxylate high performance water-reducing agent, setting accelerator, flocculant, air-entraining agent, rust inhibitor, fine aggregate and coarse aggregate successively at the required ratio of the raw materials, placing them in a mixing drum for stirring at a constant speed for 5-10 minutes until the materials are stirred to be uniform, slowly adding water at the required weight proportion to the mixing drum and stirring continuously for 1-2 minutes until the materials are uniformly viscous.

9. A method for preparing the cement-based composite material of claim 3, wherein the method is specifically as follows: weighing the calcium aluminate, silicate cement, magnesium oxide, sulfur trioxide, polycarboxylate high performance water-reducing agent, setting accelerator, flocculant, air-entraining agent, rust inhibitor, fine aggregate and coarse aggregate successively at the required ratio of the raw materials, placing them in a mixing drum for stirring at a constant speed for 5-10 minutes until the materials are stirred to be uniform, slowly adding water at the required weight proportion to the mixing drum and stirring continuously for 1-2 minutes until the materials are uniformly viscous.

10. A method for preparing the cement-based composite material of claim 4, wherein the method is specifically as follows: weighing the calcium aluminate, silicate cement, magnesium oxide, sulfur trioxide, polycarboxylate high performance water-reducing agent, setting accelerator, flocculant, air-entraining agent, rust inhibitor, fine aggregate and coarse aggregate successively at the required ratio of the raw materials, placing them in a mixing drum for stirring at a constant speed for 5-10 minutes until the materials are stirred to be uniform, slowly adding water at the required weight proportion to the mixing drum and stirring continuously for 1-2 minutes until the materials are uniformly viscous.

11. A method for preparing the cement-based composite material of claim 5, wherein the method is specifically as follows: weighing the calcium aluminate, silicate cement, magnesium oxide, sulfur trioxide, polycarboxylate high performance water-reducing agent, setting accelerator, flocculant, air-entraining agent, rust inhibitor, fine aggregate and coarse aggregate successively at the required ratio of the raw materials, placing them in a mixing drum for stirring at a constant speed for 5-10 minutes until the materials are stirred to be uniform, slowly adding water at the required weight proportion to the mixing drum and stirring continuously for 1-2 minutes until the materials are uniformly viscous.

12. A method for preparing the cement-based composite material of claim 6, wherein the method is specifically as follows: weighing the calcium aluminate, silicate cement, magnesium oxide, sulfur trioxide, polycarboxylate high performance water-reducing agent, setting accelerator, flocculant, air-entraining agent, rust inhibitor, fine aggregate and coarse aggregate successively at the required ratio of the raw materials, placing them in a mixing drum for stirring at a constant speed for 5-10 minutes until the materials are stirred to be uniform, slowly adding water at the required weight proportion to the mixing drum and stirring continuously for 1-2 minutes until the materials are uniformly viscous.

* * * * *